United States Patent [19]
Ledergerber et al.

[11] 3,762,035
[45] Oct. 2, 1973

[54] METHOD OF MACHINING WORK-PIECES ON OPPOSITE SIDE IN A MACHINE TOOL

[76] Inventors: Alfred Ledergerber; Hans Jacoby, both of Bielefeld, Germany

[22] Filed: Dec. 17, 1971

[21] Appl. No.: 209,261

Related U.S. Application Data

[62] Division of Ser. No. 801,026, Feb. 20, 1969, Pat. No. 3,643,307.

[30] Foreign Application Priority Data
Feb. 23, 1968 Germany.................. P 16 52 728.9

[52] U.S. Cl. .................................. 29/558, 29/38 B
[51] Int. Cl. ...................... B23p 13/00, B23p 23/02
[58] Field of Search .................. 29/38 R, 38 B, 558; 82/2.5, 3, 34

[56] References Cited
UNITED STATES PATENTS
2,063,831  12/1936  Rupple.................................. 29/38
2,128,186  8/1938  Jones...................................... 29/38
2,402,990  7/1946  Drissner................................. 29/38
2,876,527  3/1959  Matlachowsky........................ 29/38
3,423,812  1/1969  Spur..................................... 29/38 B Primary Examiner—Charles W. Lanham
Assistant Examiner—E. M. Combs
Attorney—Michael S. Striker

[57] ABSTRACT

A method of machining workpieces on opposite sides in a four-spindle machine in which the workpieces are moved along a circular path between a succession of four equidistant stations of which the first and second station comprise machining stations, in which a workpiece is mounted on a spindle at the fourth station preceding the first station, than indexed to the first and second station to be machined at one side at each of the stations, then indexed to the third station and removed from its spindle and mounted in reverse position on the spindle at the fourth station, whereafter it is again indexed to the first and second station to be machined on the other side thereof while a new workpiece is mounted on the spindle at the fourth station.

9 Claims, 19 Drawing Figures

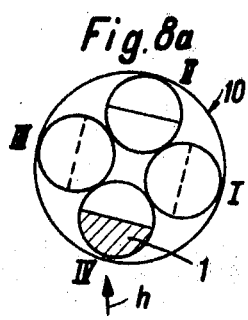
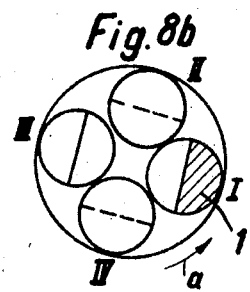
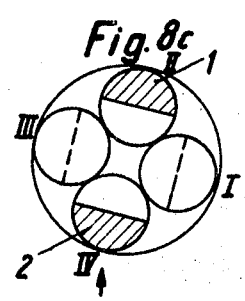
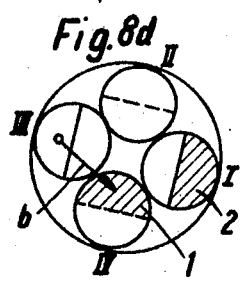
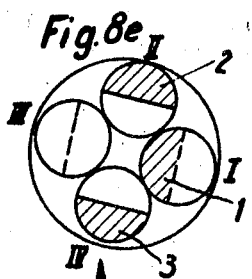
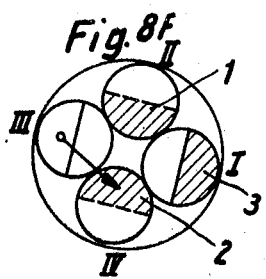
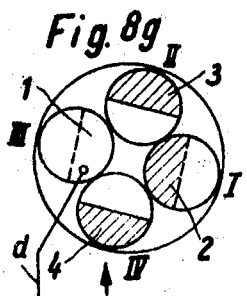
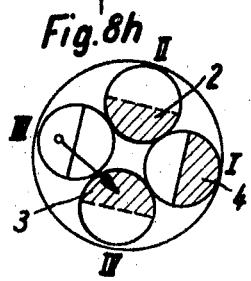
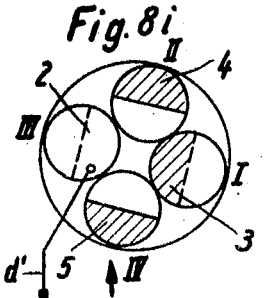
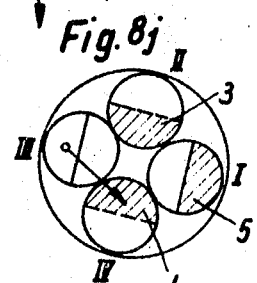
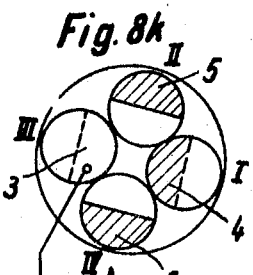
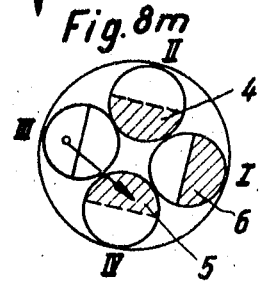

METHOD OF MACHINING WORK-PIECES ON OPPOSITE SIDE IN A MACHINE TOOL

CROSS-REFERENCE TO RELATED APPLICATION

The present application is a divisional application of the copending application, Ser. No. 801,026, filed Feb. 20, 1969, now U.S. Pat. No. 3,643,307.

BACKGROUND OF THE INVENTION

The present invention relates to a method of machining workpieces on opposite sides in machine tools and more particularly to improvements machining workpieces in multiple-spindle machine tools which can be utilized for milling, boring, grinding, turning or analogous work.

A serious drawback of many presently known machine tools with one or more work spindles is that the conversion from treatment of a first type to treatment of a second type of workpieces consumes much time. The major part of time which is required to change the setup is consumed for interchange, replacement and/or addition of tools as well as to program the operation of tool holders. As a rule, the programming means includes cams which must be replaced during each setup. Additional cams or like motion-transmitting parts which are mounted directly on the frame and/or various slides of such machine tools must also be adjusted, replaced or otherwise manipulated in a time-consuming way. The nature of treatment is dependent not only on the number of work spindles but also on the size of the working stations and on the type of tools which are used to remove material from workpieces. Complicated multi-state treatment of workpieces is normally performed in machine tools which are provided with a large number of work spindles.

Multiple-spindle machine tools which embody a large number (for example, six or eight) work spindles exhibit several important advantages but also many serious drawbacks. For example, a large number of tools must be mounted in a time-consuming operation to insure simultaneous engagement between such tolls and the workpieces which dwell at the respective treating stations. Removal or interchange of a single tool normally necessitates idling of the entire machine tool. Furthermore, the quantity of shavings and chips which are removed in a machine tool with a large number of work spindles is very high so that the removal of chips or shavings necessitates the provision of costly and complicated auxiliary equipment. Also, at least some of the stations are not readily accessible. The versatility of such machine tools is rather limited; for example, it is difficult to design a machine tool with a large number of spindles in such a way that the rotational speeds of work spindles at two adjoining stations are widely different, and it is even more difficult to provide each station with means for rotating the work spindles at two or more speeds. As a matter of fact, the system alone which changes the rotational speed of work spindles from station to station is so complicated and expensive that it contributes significantly to the initial and maintenance cost of conventional machine tools with six or more spindles.

As regards the single-spindle machine tools, they also exhibit many important advantages as well as drawbacks. The material removing action of tools in a single-spindle machine tool is normally more satisfactory than in a multiple-spindle machine tool. However, the chuck of the spindle in a single-spindle machine tool must be replaced or adjusted when the workpiece must be treated at two sides; this takes up much time and affects the output, especially if such machine tools are used for treatment of small batches of workpieces. Another drawback of single-spindle machine tools is that the spindle must be brought to a full stop prior to removal, attachment or inversion of workpieces so that such work cannot be performed while a workpiece undergoes a grinding, milling or other material removing treatment. Finally, nearly all programmed single-spindle machine tools are capable of subjecting workpieces to only one treatment at a time so that the output of such machine tools is well below the output of a multiple-spindle machine tool.

SUMMARY OF THE INVENTION

It is an object of our invention to provide a novel method of treating workpieces in multiple-spindle machine tools in a time-saving operation.

Another object of the invention is to provide a method according to which several sides or ends of workpieces can be treated in rapid sequence, without necessitating temporary storage during inversion, and in a small area.

The method of our invention is employed for treatment of preferably metallic workpieces in a multiple-spindle machine tool wherein the workpieces are movable by the chucks or spindles of a carrier which indexes the spindles along a circular path between a succession of four equidistant stations of which the second and third stations constitute two treating stations where the workpieces are subjected to one or more material removing treatments by boring, drilling, milling, grinding or analogous tools. The method comprises the steps of introducing a first workpiece at the first station (i.e., while a spindle dwells at such first station), moving the workpiece to at least one of the treating stations and subjecting one of its sides (or ends) to at least one material removing treatment (for example, to form therein a circumferential groove, a circumferential shoulder or the like), moving the workpiece to the fourth station and thereupon inverting and transferring the workpiece to at least one of the treating stations, subjecting the other side (or end) of the thus inverted workpiece to at least one material removing treatment (for example, to provide it with a smooth or tapped bore, with an axially extending groove or with a circumferentially extending shoulder or groove), moving the workpiece to the fourth station, and withdrawing the workpiece from the machine tool at the fourth station. A second workpiece is introduced at the first station while the first workpiece dwells at one of the treating stations.

The partially finished workpieces can be moved from the fourth station directly to one of the treating stations or from the fourth station to the first station and thereupon to one of the treating stations, depending upon whether the carrier for the work spindles is indexed by 90 degrees or by a whole multiple of 90 degrees.

The machine tool for carrying out the method is designed in such a way that the first and fourth stations are readily accessible at the front side of its frame and that all of the stations are located at different levels, i.e., one of the treating stations is located at a level above or below the other treating station, the first station is located at a level which is different from the level of the fourth station, and the levels of the treating stations are different from the levels of the first and fourth stations.

The novel features which are considered as characteristic of the invention are set fourth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIGS. 8a to 8m illustrate the steps of treating workpieces in the machine tool of FIG. 1.

DESCRIPTION OF THE PREFERRED EMBODIMENTS

Figure 1:
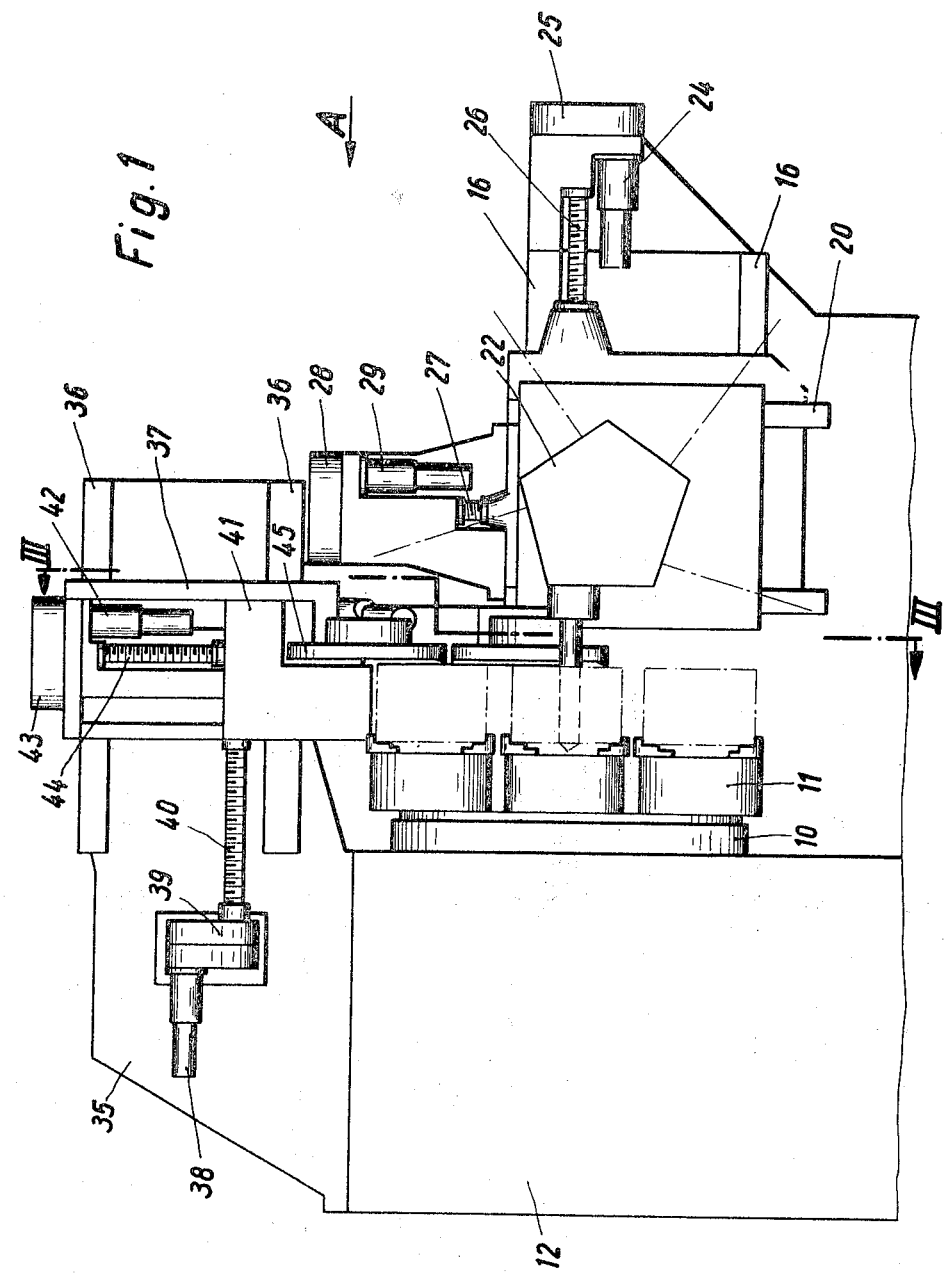
FIG. 1 is a front elevational view of a machine tool with four work spindles which embodies one form of our invention.
Figure 2:
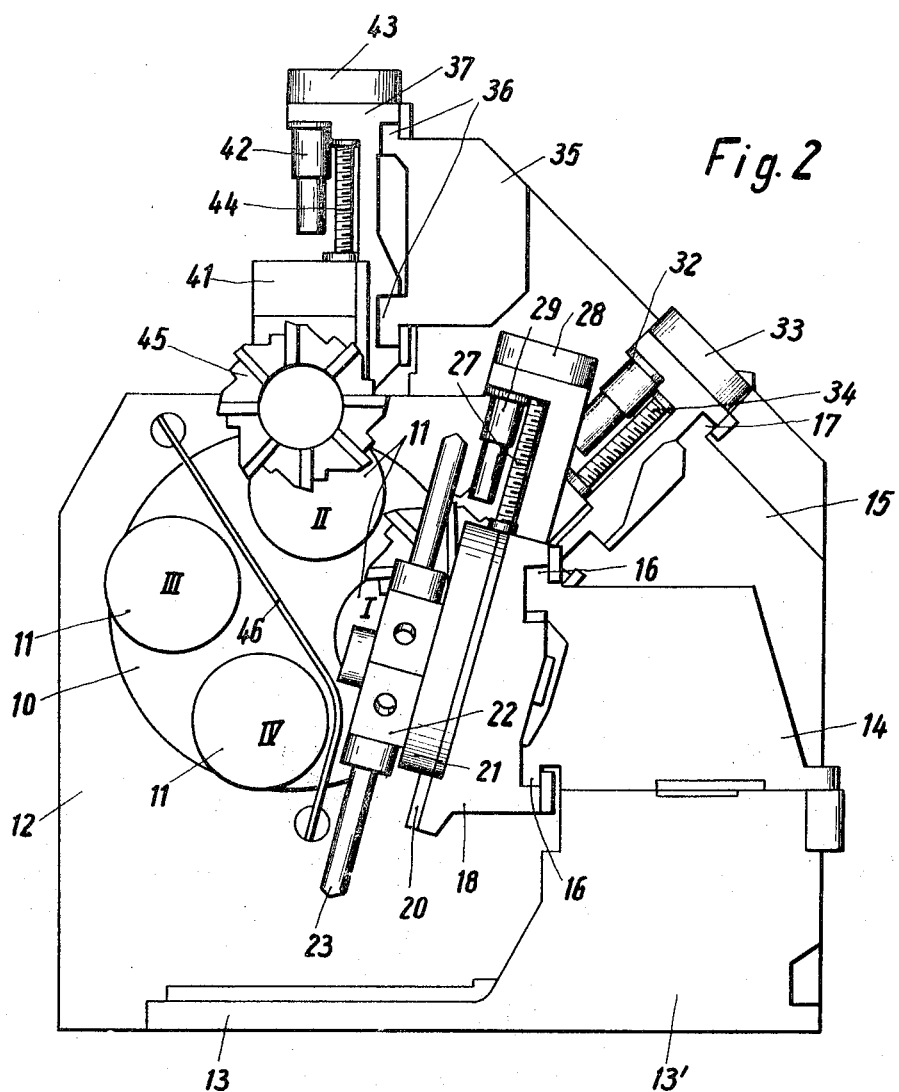
FIG. 2 is a side elevational view of the machine tool as seen in the direction of arrow A in FIG. 1.
Figure 3:
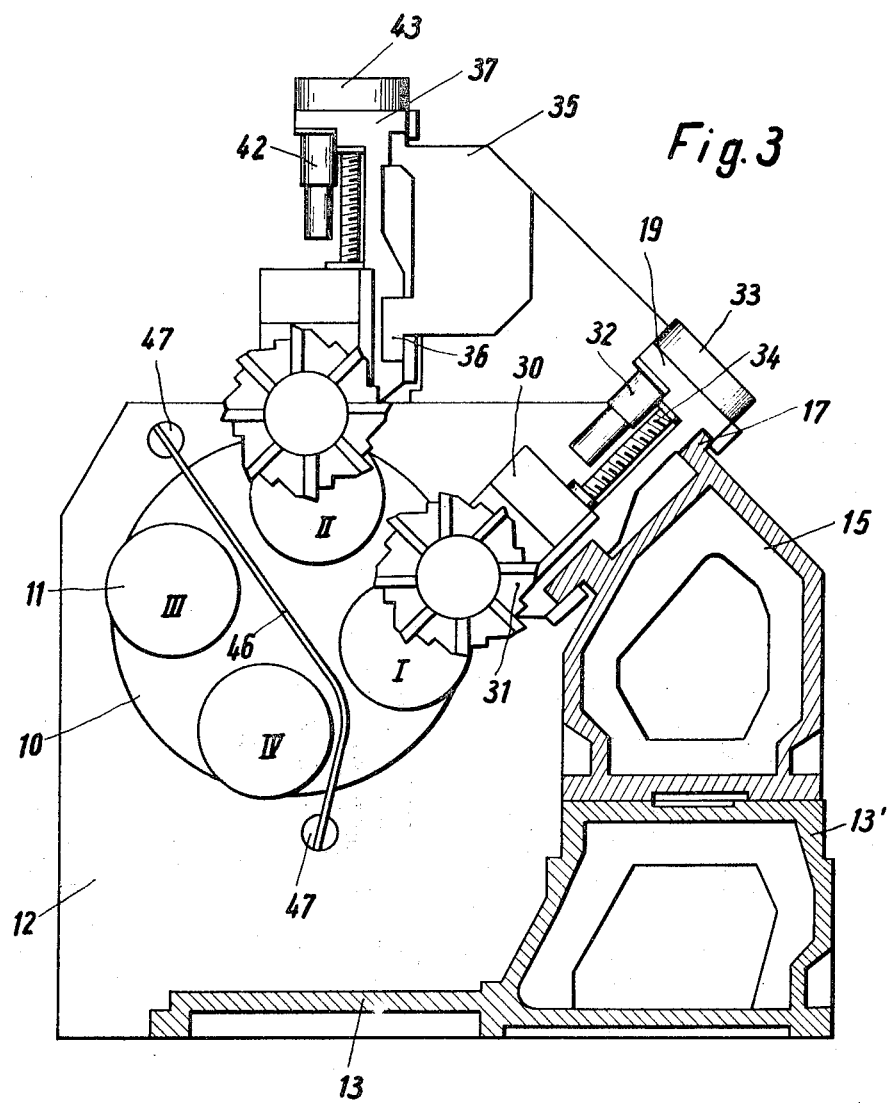
FIG. 3 is a sectional view as seen in the direction of arrows from the line III—III of FIG. 1.

Referring to FIGS. 1 to 3, there is shown a machine tool which comprises a frame supporting drum-shaped carrier 10 which supports four equidistant work spindles 11. The carrier 10 is indexible about a horizontal axis and the axes of spindles 11 are parallel to and located at the same distance from such axis. In each rest position of the carrier 10, the four spindles 11 are located at different levels. As shown in FIG. 2, the line connecting the spindles 11 which occupy the stations I and III makes an angle of about 20 degrees with a horizontal plane, and the line connecting the axes of spindles 11 which occupy the stations II and IV makes an angle of about 20 degress with a vertical plane. The stations I and II are treating stations and each thereof accommodates one or more tool holders which are driven independently of each other. The stations III and IV are accessible to the operator standing at the front side of the machine frame. The station III accommodates a work changing device and the machine tool further includes an inverting device which can invert workpieces by simultaneously transferring such workpieces from the station III to station IV or I. The tools which treat workpieces at the stations I and II cannot interfere with insertion, removal or inversion of workpieces or with each other, and the stations III and IV are readily accessible and observable from the front side of the frame. This front side is the left-hand side, as viewed in FIG. 2 or 3.

The machine frame comprises an upright support 12 for the carrier 11. This support is mounted on a base 13 and is preferably integral therewith, i.e., the parts 12, 13 may constitute a one-piece casting. The rear portion 13' of the base 13 supports two hollow blocks or supports 14, 15 which are respectively provided with horizontal ways 16, 17 for longitudinally movable main slides 18 and 19. The main slide 18 is formed with ways 20 which extend at right angles to the ways 16 and guide a cross slide 21. This cross slide supports an indexible tool holder or turret 22 whose axis make an angle of about 20 degrees with a horizontal plane (see particularly FIG. 2). The plane of the turret 22 is parallel to the line connecting the axes of work spindles 11 which occupy the stations II and IV. The turret 22 carries tools 23 and is rotated in such direction that the tools which move upwardly leave the station I.

The main slide 18 is driven by a reversible electric motor 24 whose output shaft rotates the input member of a step-down transmission 25. The latter drives a feed screw 26 (see FIG. 5) which moves the main slide 18 along the ways 16. The cross slide 21 is driven by a feed screw 27 which is driven by a reversible motor 29 by way of a step-down transmission 28.

The second main slide 19 is provided with ways for a second cross slide 30 which supports a tool holder 31. The cross slide 30 is driven by a reversible motor 32 by way of a step-down transmission 33 and a feed screw 34. A further reversible motor drives the main slide 19 by way of a step-down transmission and feed screw.

The tool holders 22 and 31 are arranged to treat workpieces at the station I.

The frame of the machine tool further includes a support 35 provided with horizontal ways 36 for a longitudinally movable main slide 37 which is reciprocable by a reversible electric motor 38 by way of a transmission 39 and feed screw 40. The slide 37 is provided with vertical ways for a cross slide 41 which is driven by a reversible motor 42 by way of a step-down transmission 43 and feed screw 44. The cross slide 41 supports a tool holder 45 for tools which treat workpieces at the station II.

A protective wall or partition 46 is installed between the stations I, II and III, IV. This partition 46 is mounted in two bolts 47 carried by the support 12. One of the functions of partition 46 (when in operative position) is to prevent penetration of chips or shavings into the stations III and IV. Such chips or shavings are removed from workpieces at the stations I and II. They could interfere with changing and/or inversion of workpieces at the stations III and IV. Prior to indexing of the carrier 11, the partition 46 is shifted to an inoperative position by being moved along a horizontal path away from the path of movement of work spindles 11.

Figure 4:
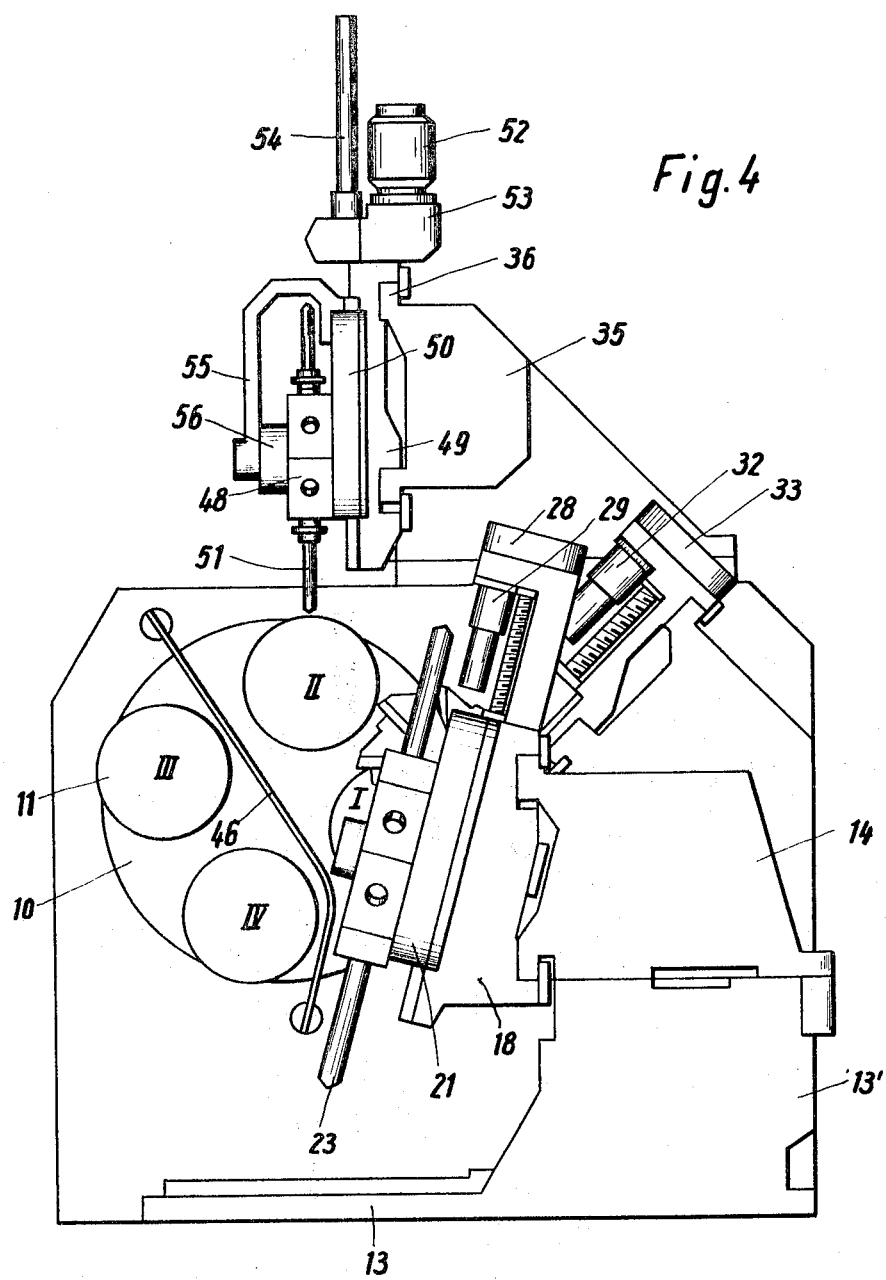
FIG. 4 is a side elevational view of a machine tool with a different set of tool holders.

In FIG. 4, the tool holder 45 is replaced by a turret-shaped tool holder 48 for milling tools. The main slide 37 of FIGS. 1 to 3 is replaced by a main slide 49 which is reciprocable along the ways 36 of the support 35 and carries a cross slide 50 for the turrent 48. The milling or boring tools 51 in the turrent 48 are driven by a motor 52 by way of a transmission 53, for example, one including a friction clutch or the like. The tools 51 are fed axially by a hydraulic cylinder 54. However, it is equally possible to feed the tools 51 by means of an electrically operated drive. A yoke 55 is provided on the cross slide 50 to serve as an additional support for the turret 48. The yoke 55 further carries switching and arresting means 56 for the turret 48.

Figure 5:
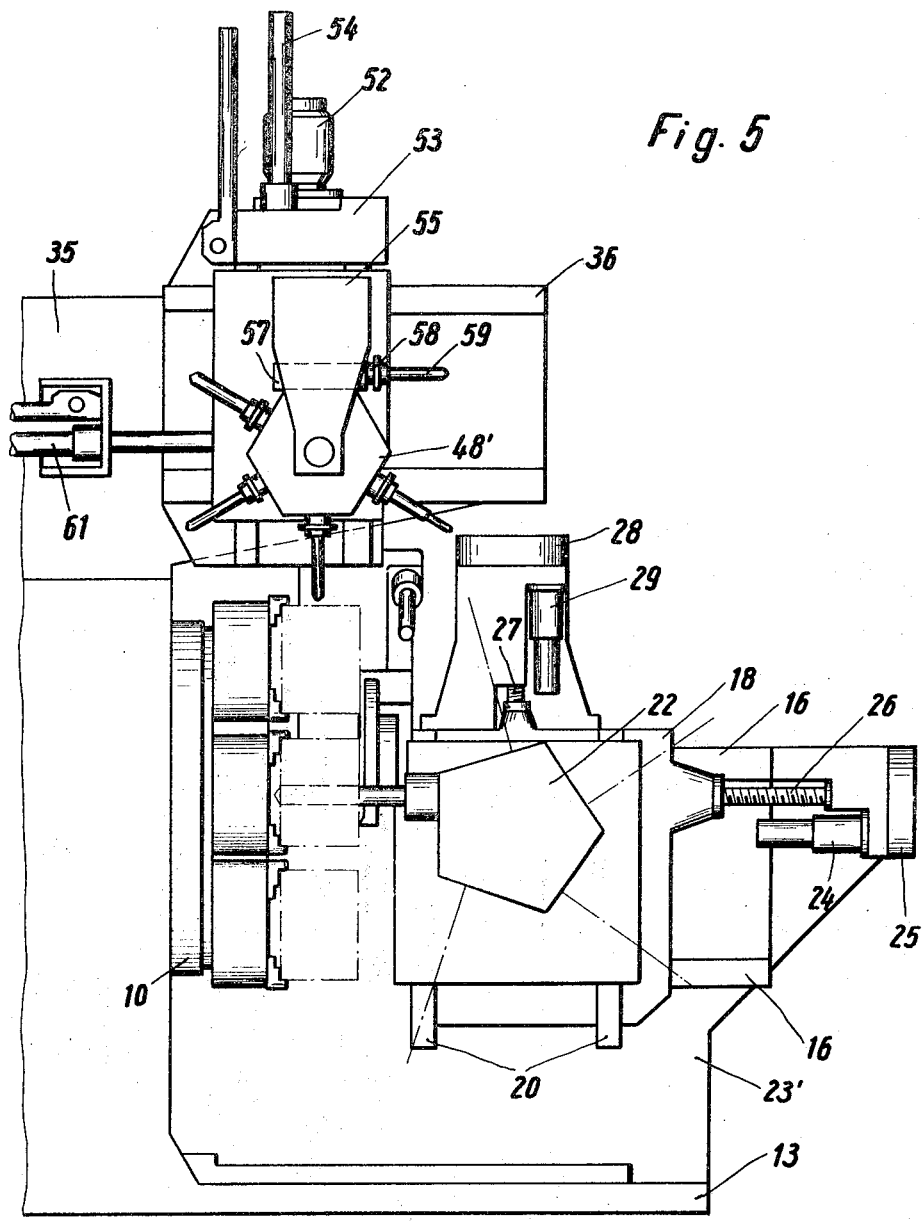
FIG. 5 is a fragmentary front elevational view of the machine tool with a third set of tool holders.

FIG. 5 illustrates the machine tool of FIG. 4 with a modified hexagonal tool holder or turret 48'. This turret carries tools which treat workpieces at the station II and one of its facets supports a housing 57 with a boring spindle 58 whose axis is parallel to the respective facet and which accommodates a boring tool 59. The tool 59 can be used to drill holes in front faces of workpieces held by spindles 11 at the station II. The remaining tools which extend radially of the turret 48' are used to form holes or bores in the peripheral surfaces of workpieces at the station II. The turret 48' is movable up and down by a hydraulic cylinder 54. A second hydraulic cylinder 61 is provided to reciprocate the turret 48' in a horizontal plane. Means are provided for measuring the extent of movement of turret 48' along or at right angles to the ways 36 on the support 35. Such measuring means comprise adjustable angle coding devices and toothed racks which serve to move the coding devices. The racks are connected with the corresponding slides (37 and 41) and automatically adjust the coding devices in response to displacement of the respective slides.

Figure 6:
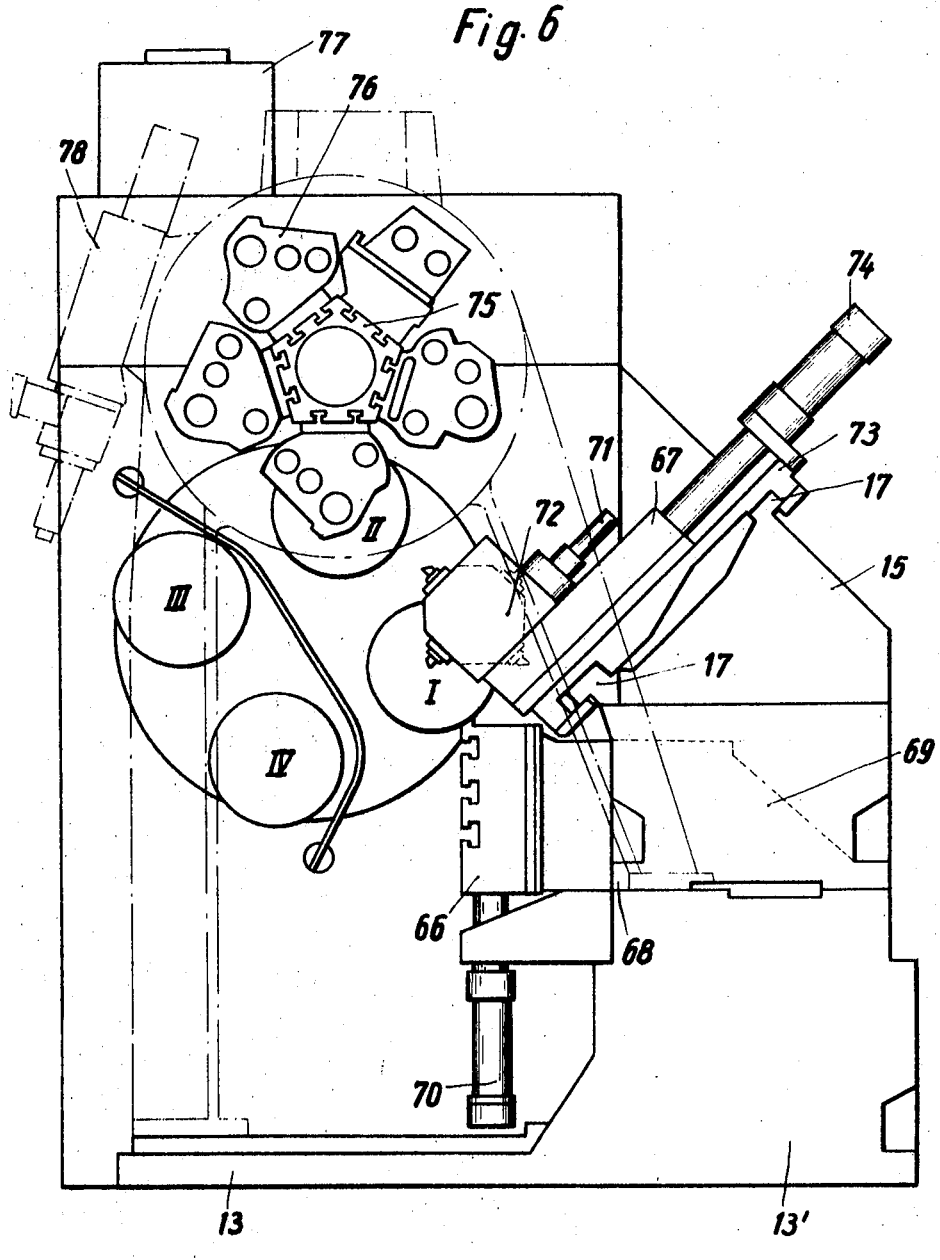
FIG. 6 is a side elevational view of a machine tool with a fourth set of tool holders.

Referring to FIG. 6, there are shown two cross slides 66, 67, which support tools serving to treat workpieces at the station I. The cross slide 66 is movable along vertical ways 68 provided in a supporting bracket 69 and is reciprocable by a hydraulic cylinder 70. The cross slide 67 is mounted on a main slide 73 which replaces the main slide 19 and is guided by ways 17 of the support 15. The cross slide 67 is reciprocable by a hydraulic cylinder 74 which, however, can be replaced by a drive including an electricl motor. A tetragonal turret 72 mounted on the cross slide 67 is turnable by an indexing cylinder 71. The turret 72 serves as a holder for tools which treat wrokpieces at the station I.

Workpieces at the station II of the machine tool shown in FIG. 6 are treated by tools mounted on a pentagonal tool holder or turret 75. This turret 75 carries tool holders 76 which are similar to those employed in single spindle automatics. The turret 75 is movable axially by a suitable motor, not shown, a transmission 77 and a feed screw (not shown). The means for rotating the turret 75 comprises a hydraulic indexing device 78.

Figure 7:
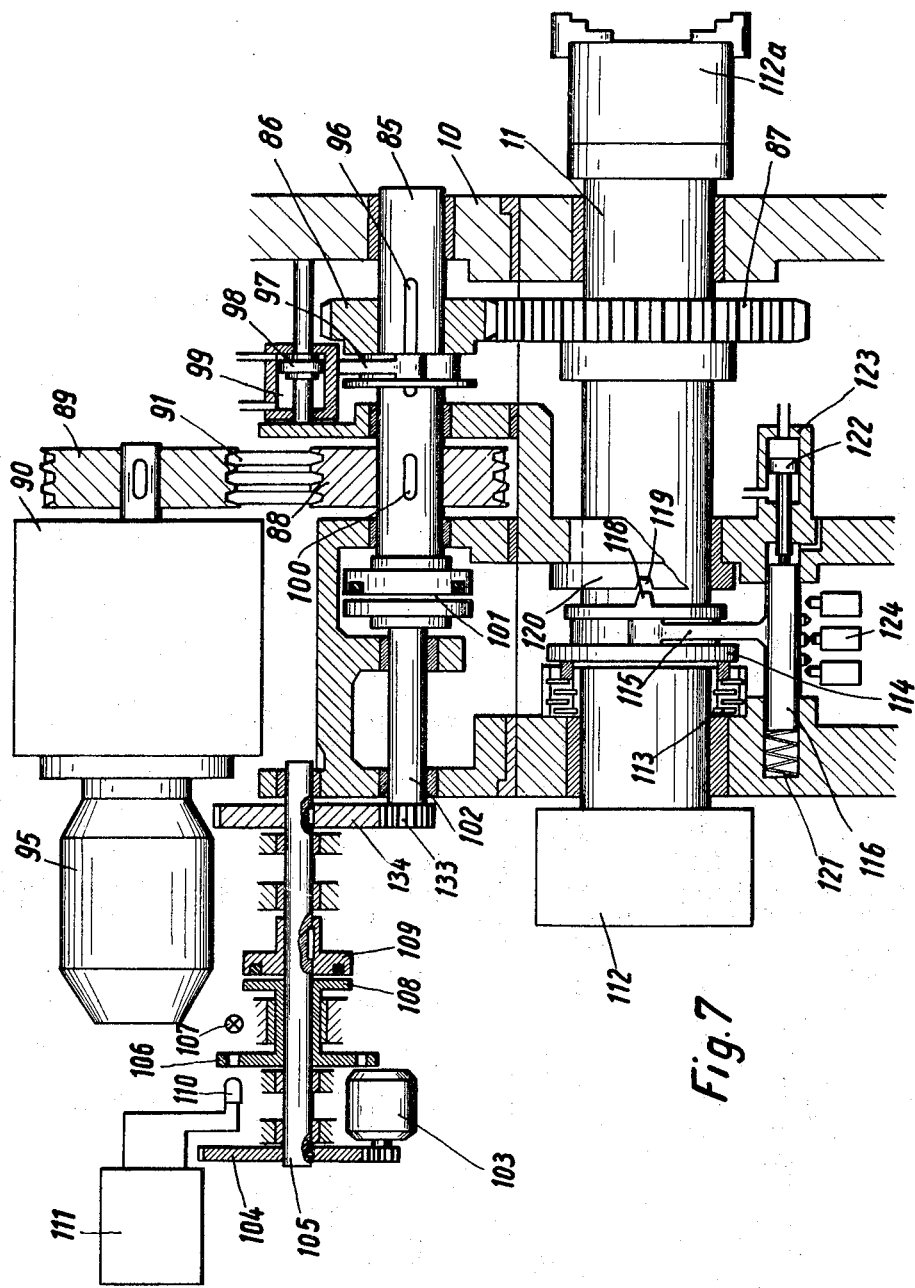
FIG. 7 is an enlarged fragmentary longitudinal vertical sectional view of the machine tool, showing the details of a device which can arrest work spindles in predetermined angular positions at one of the treating stations.

A portion of the means for rotating the spindles 11 which are located at the stations I and II is shown in FIG. 7. Such means comprises two discrete transmission units 90 one of which is illustrated in FIG. 7. Each unit 90 is mounted externally of the support 12 so that heat generated by moving parts of such units is not transmitted to the parts 10 and 11. The unit 90 (not shown) which drives the spindle 11 occupying the station I is installed in the aforementioned rear portion 13' of the base 13. The transmission unit 90 which rotates spindles 11 occupying the station II is mounted on a bracket or upright which is affixed to a suitably finished surface at the rear side of the support 12. Each transmission unit 90 is adjustable by means of screws or the like in such a way that the operator can change the tension of V-belts 91 which are trained over pulleys 88 and 89. Each unit 90 comprises a set of electromagnetic clutches which enable the operator to change the RPM of spindle 11 at the station I independently of RPM of spindle 11 at the station II or vice versa.

The pulley 88 of FIG. 7 is keyed at 100 to drive shaft 85 which rotates a driver gear 86. This driver gear is movable axially of the shaft 85 by a shifter fork 97 so that it can be moved into and away from mesh with the gear 87 of the spindle 11 which occupies the station II. The means for operating the shifter fork 97 comprises a double-acting hydraulic cylinder 99 having a reciprocable piston 98.

In order to enhance the versatility of the machine tool, for example, to enable the machine tool to provide workpieces with transversely extending bores in addition to performing a turning operation, a work spindle 11 which leaves the station I where the respective workpiece was treated by one or more turning tools must be brought to a halt when it reaches the station II. The spindle 11 was driven at the station I to rotate the workpiece during turning. In other words, the spindle 11 which advances from the station I toward the station II must be disconnected from its drive and brought to a full stop (insofar as its rotary movement is concerned) in a predetermined angular position with reference to the axis of the carrier 10. As a first step, it is advisable to reduce the rotational speed of the spindle 11 to a rather low value. The drive means for rotating the spindle 11 at such low speed includes a special indexing motor 103 whose output shaft carries a pinion meshing with a gear 104 on a shaft 105. The latter drives a second gear 134 which meshes with a gear 133 on a shaft 102. This shaft carries one disk of a magnetic clutch 101 which transmits torque from the motor 103 to the drive shaft 85. The shaft 85 is disconnected from the main drive motor 95 for the work spindles 11 when the clutch 101 is engaged to connect the shaft 85 with the shaft 102.

The means for arresting the spindles 11 in a predetermined angular position at the station II comprises couplings which include rings 120 provided in the carrier 11 and each coaxial with one of the spindles 11. Each ring 120 has a notch 119 and each spindle 11 is provided with an axially reciprocable coupling sleeve 114 having a projecting or tooth 118 which can enter the respective notch 119. The means for moving the sleeve 114 axially comprises a shifter fork 115 whose carriage 116 is biased by dished springs 121 in one direction and can be moved in opposite direction by a piston 122 which is reciprocable in a hydraulic cylinder 123.

The machine tool further comprises brakes 113 which rapidly decelerate the spindles 11 which are to be held in a predetermined angular position when they reach the station II so that the corresponding workpiece can be subjected to a drilling, boring or like operation of the type which necessitates that the workpiece be held at a standstill. Each brake 113 is mounted on the respective spindle 11.

In order to arrest a spindle 11, the magnetic clutches in the power train between the motor 95 and the shaft 85 are disengaged and the coupling sleeve 114 is moved from its central or neutral position in a direction to the left, as viewed in FIG. 7, so as to actuate the brake 113. Such movement of the sleeve 114 is effected by the cylinder 122 which shifts the carriage 116 for the shifter fork 115 against the opposition of the springs 121. The positions of the carriage 116 are detected by switches 124 which control the flow of hydraulic pressure medium to and from the chambers of the cylinder 123.

If a workpiece occupying the station II of the machine tool shown in FIG. 7 is to be provided with a groove and thereupon with a bore or with a second groove in a predetermined angular position with reference to the first groove, the corresponding spindle 11 is brought to a halt in the position which is determined by the tooth 118 of the coupling sleeve 114 when the tooth enters the notch 119 of the corresponding coupling ring 120. The first groove is then machined into the workpiece at the station II while the spindle 11 is held at a standstill. A clutch 109 is then maintained in energized condition whereby this clutch couples to the shaft 105 a flange 108 which is integral with a timer disk 106. When the clutch 109 is deenergized, the shaft 105 rotates with reference to the timer disk 106. On energization of the clutch 109, the disk 106 rotates with the shaft 105 at the speed determined by the motor 103 and causes a photosensitive transducer including a light source 107 and a photosensitive receiver 110 to erase signals stored in an electronic counter 111. When the formation of the first groove is completed, the clutch 101 is energized to index the spindle 11 at the station II. The shaft 105 rotates the timer disk 106 whereby the latter causes the receiver 110 to transmit to the timer 111 a signal whenever an aperture of the disk 106 moves into registry with the light source 107. When the timer 111 receives a predetermined number of signals, it automatically opens the circuit of the motor 103 to thereby arrest the spindle 11 at the station II in a predetermined angular position. The clutches 101,109 are then disengaged and the workpiece at the station II can be formed with a second groove or with a bore. The spindle 11 is caused to leave the station II upon completion of the treatment.

The rear end of each spindle 11 carries a customary actuating cylinder 112 for the work-engaging chuck 112a which is provided at the forward end of the respective spindle and serves to releasably hold the workpiece during movement from the station IV, through the stations I, II, III and back to the station IV or I, or from the station III to a suitable takeoff conveyor.

One mode of operation of the improved machine tool will be described with reference to FIGS. 8a to 8m. The carrier 10 is indexed through angles of 90 degrees. In FIG. 8a, a first workpiece 1 is fed to the chuck of spindle 11 occupying the station IV (arrow w). The carrier 10 is then indexed by 90 degrees (arrow a in FIG. 8b) so that the first workpiece 1 reaches the first treating station I. Upon completion of the first treatment, the workpiece 1 is moved to the second treating station II and is subjected to one or more additional material removing operations (see FIG. 8c). The spindle 11 at the station IV receives a second workpiece 2 while the workpiece 1 dwells at the station II. The further indexing of the carrier 10 (FIG. 8d), the workpiece 2 reaches the station I and is treated in the same way as the preceding workpiece 1 while the workpiece 1 reaches the inverting station III. This workpiece 1 is clamped by the chuck of a spindle 11 which is held against rotation, and the workpiece 1 is then inverted and simultaneously transferred into the chuck of the spindle 11 at the station IV (this is indicated by the inclined arrow b shown in FIG. 8d). The carrier 10 is thereupon indexed (FIG. 8e) to advance the workpiece 2 to the station II and to simultaneously advance the inverted workpiece I to the station I. The chuck of the spindle 11 at the station IV then receives a third workpiece 3. The tool or tools at the station I treat the second side of the workpiece 1 while the first side of the workpiece 2 undergoes final treatment at the station II.

The carrier 10 is indexed again (see FIG. 8f) so that the first side of the workpiece 3 can be treated at the station I, that the second side of the workpiece 1 can be subjected to final treatment at the station II, and that the workpiece 2 can be inverted at the station III and is simultaneously introduced into the chuck of the spindle at the station IV. On further indexing of the carrier 10 (FIG. 8g), the first workpiece 1 (both sides of which were subjected to treatment at stations I and II) is removed from the chuck at the station III (as indicated by arrow d), the second side of the workpiece 2 is subjected to first treatment at the station I, the first side of the workpiece 3 is subjected to final treatment at the station II, and the chuck at the station IV receives a fourth workpiece 4.

When the carrier 10 is indexed again (FIG. 8h), the first side of workpiece 4 is subjected to treatment the station I, the second side of workpiece 2 is subjected to final treatment at the station II, and the workpiece 3 is inverted at the station III and is transferred into the chuck of spindle 11 at the station IV. On renewed indexing of the carrier 10 (FIG. 8i), the workpiece 2 is removed from the station III (arrow d'), the station IV receives a fresh workpiece 5, the second side of workpiece 3 is subjected to a first treatment at station I, and the first side of workpiece 4 is subjected to a final treatment at the station II. Renewed indexing of carrier 10 moves the workpieces 3–5 to the positions shown in FIG. 8j, i.e., the first side of workpiece 5 is subjected to a first treatment at the station I, the second side of workpiece 3 is subjected to final treatment at station II, and the workpiece 4 is inverted at the station III and is immediately transferred into the chuck at the station IV. In the position of the carrier 10 which is shown in FIG. 8k, the workpiece 3 is removed from the station III (arrow d''), the station IV receives a fresh workpiece 6, the station I receives the workpiece 4 whose second side is subjected to a first treatment, and the station II accommodates the workpiece 5 the first side of which is subjected to final treatment. In FIG. 8m, the second side of workpiece 4 is subjected to final treatment at the station II, the first side of workpiece 6 is subjected to initial treatment at the station I, and the workpiece 5 is inverted at station III and is immediately transferred into the chuck at the station IV.

When the machine tool is started (FIGS. 8a to 8c), no workpiece is introduced at the station IV upon completion of the first indexing step (see FIG. 8b). The first workpiece 1 can be inverted in response to first indexing following insertion of the second workpiece 2 (see FIG. 8d). In the stage shown in FIG. 8e, the carrier 10 is fully loaded in that its spindles support three workpieces 1, 2 and 3. From then on, a fresh workpiece (4, 5, 6, etc.) is inserted upon each second indexing of the carrier 10 and a finished workpiece is removed from the machine tool simultaneously with the insertion of a fresh workpiece so that the number (three) of workpieces which are mounted on the carrier remains unchanged. A workpiece is inverted and transferred in response to each second indexing of the carrier 10.

In accordance with a modification of our method, the machine tool whose parts are shown in FIGS. 8a to 8m can be operated in a different way provided that the treatment of each side of a workpiece can be completed at a single station, for example, at the station I. A fresh workpiece is then inserted at the station Iv and the carrier 10 is indexed through 180 degrees to move the freshly inserted workpiece to the station I where the tool or tools complete the treatment of one side of the workpiece. The carrier 10 is then indexed by 180 degrees so that the first workpiece is returned to the station IV. This workpiece is transferred from the chuck at the station IV to the chuck at the station I and is simultaneously inverted so that the tool or tools at the station I complete the treatment of the other side of such workpiece. At the same time, the chuck at the station IV receives a second workpiece. The carrier 10 is again indexed through 180 degrees so that the first workpiece (which was treated at both sides) reaches the station IV and is replaced by a third workpiece. The same procedure is repeated again and again whereby the workpiece which was treated at one side is inverted and moved from station IV to station I so that the station IV can receive a fresh workpiece or that a workpiece which was treated at both sides is removed from the station IV which is then ready to receive a fresh workpiece.

In FIGS. 8a to 8m, the first sides of workpieces 1 to 6 are denoted by hatching completely surrounded by solid lines. Hatching which is surrounded in part by broken lines denotes the second sides of the workpieces. Thus, FIGS. 8a–8c show the first side of the workpiece 1 whereas FIGS. 8d–8f show the second side of such workpiece.

It is preferred to equip two spindles 11 which are located diametrically opposite each other (with reference to the axis of the carrier 10) with chucks 112a of a first type and to equip the other two work spindles with the chucks of a second type.

The improved machine tool exhibits several important advantages. Thus, it can be readily and rapidly converted for treatment of different workpieces. This can be achieved by replacing the tool holder 48' (FIG. 5) for rotary and/or reciprocable material removing tools with the tool holder 45 (FIG. 2) for fixedly mounted tools or vice versa, by replacing the tool holder 45 or 48' with the tool holder 48 (FIG. 4), by replacing the tool holder 48, 48' or 45 with the tool holder 75 (FIG. 6), by replacing the tool holder 31 with the tool holder 48 or 48' or a number of other ways. The machine tool is adjustable so that the removal of material from workpieces at the station I and/or II can be regulated with a requisite degree of precision. The partition 46 insures that the shavings and chips accumulate in a predetermined area without contaminating the station III or IV or other parts of the machine tool. The number of treatments can be selected at the will of the operator, i.e., each workpiece can be subjected to one or more treatments, either at one side or at both sides. The stations III and IV are readily accessible so that the operator can control the insertion or removal of workpieces, the inversion of workpieces and/or the transfer of workpieces from the station III to the station IV or I. Also, at least some of the tool holders at the stations I and II are readily accessible, particularly those at the station II, not only when the machine tool is idle but also in operation. Workpieces can be changed, transferred and/or inverted while the tools at the station I and/or II treat freshly introduced or partly finished workpieces. Furthermore, the workpieces which are to be treated at two sides need not be deposited during inversion, i.e., they can be transported directly from the station III to the station I or IV without necessitating the provision of a magazine, platform or other temporary storing means therefor. The chucks or analogous work engaging devices of the spindles 11 at stations I to IV are preferably designed in such a way that they can properly support, without any adjustment, workpieces in inverted position or prior to inversion. Still further, the speed of spindles at the station I and/or II is preferably adjustable within a wide range, not only when the machine tool is idle but also when the tool is in use. Moreover, the workpiece held by the chuck of a spindle which is arrested in a predetermined angular position is preferably accessible to two or more tools so that it can be subjected to two or more different or similar material removing actions, either at the station I or at the station II. The machine tool can be used for turning, boring, thread cutting, milling grinding, grating, chambering and/or other work. Finally, the machine tool can be rapidly converted from treatment of workpieces which are operated upon a large number of stages to simplest treatment of workpieces in one or two stages, or vice versa.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended

1. A method of machining workpieces on opposite sides in a four spindle machine having four equidistant spindles indexible on a carrier along a circular path between a succession of four equidistant stations of which the first and second stations constitute machining stations having tool means for machining the workpieces at said first and said second stations, said method comprising the steps of introducing a workpiece at a fourth station preceding said first station; moving the workpiece in succession to said first and to said second machining stations and machining one side of said workpiece at said first and said second stations by operating said tool means at said first and second stations in a first predetermined manner; moving the workpiece after one side has been machined to a third station following said second station; removing the workpiece from said third station and inserting it in inverted position into said fourth station; subsequently moving the workpiece again in succession to said first and said second stations and machining the other side thereof by operating the tool means at said first and said second stations in a second predetermined manner differing from said first predetermined manner; moving the finished workpiece to said third station; and removing the finished workpiece from said third station.

2. A method as defined in claim 1, and including the step of introducing a new workpiece at said fourth station while a workpiece is machined at one of said machining stations.

3. A method as defined in claim 1, wherein the step of introducing a workpiece at said fourth station comprises the step of mounting the workpiece on that spindle which is indexed to said fourth station, and wherein the steps of moving the workpiece from said fourth to said first, from said first to said second, and from second to said third station comprises the steps of indexing said carrier during each such step through an angle of 90°.

4. A method as defined in claim 3, wherein said step of machining said workpiece at said first and said second station comprises the steps of rotating at least one of the spindles located at said two stations about the respective spindle axis.

5. A method as defined in claim 4, wherein only one of said spindles at said first and second station is rotated and including the step of arresting the other of said two spindles and the workpiece mounted thereon against rotation about the spindle axis and in a predetermined angular position.

6. A method as defined in claim 5, wherein the step of machining the workpiece on said other of said two spindles comprises drilling said workpiece.

7. A method as defined in claim 4, and including the step of arresting the spindles against rotation about their axes at said third and fourth station.

8. A method as defined in claim 3, and including the step of mounting a new workpiece on the spindle at said fourth station after each second indexing of the carrier through 90° so that after the first four initial indexing operations there will always be three workpieces on said spindles and two of the workpieces will be simultaneously machined.

9. A method as defined in claim 1, wherein said tool means at one of said first and second stations comprise an indexible turret having a plurality of tools projecting radially therefrom, and wherein said method includes the step of indexing the turret before said workpiece is in said reversed position again moved to said one station.

* * * * *